United States Patent
Witschorik (10) Patent No.: US 6,396,829 B1
(45) Date of Patent: May 28, 2002

(54) COMMUNICATIONS CHANNEL SYNCHRONOUS MICRO-CELL FOR INTEGRATING CIRCUIT AND PACKET DATA TRANSMISSIONS

(75) Inventor: Charles Arthur Witschorik, Naperville, IL (US)

(73) Assignee: Lucent Technologies, Inc., Murray Hill, NJ (US)

(*) Notice: Subject to any disclaimer, the term of this patent is extended or adjusted under 35 U.S.C. 154(b) by 0 days.

(21) Appl. No.: 09/347,786

(22) Filed: Jul. 6, 1999

(51) Int. Cl.[7] .................................. H04L 12/66
(52) U.S. Cl. .................... 370/352; 370/395.1; 370/465; 370/522
(58) Field of Search ................. 370/229, 230, 370/232, 234, 235, 236.1, 236.2, 352, 353, 354, 395.1, 395.43, 395.52, 401, 402, 441, 465, 393, 392, 395.54, 475, 389, 443, 458, 468, 470, 471, 472, 473, 474, 522

(56) References Cited

U.S. PATENT DOCUMENTS

| | | | | |
|---|---|---|---|---|
| 5,774,469 A | * | 6/1998 | Wirkestrand | 370/473 |
| 5,802,050 A | * | 9/1998 | Petersen et al. | 370/394 |
| 5,809,023 A | * | 9/1998 | Petersen et al. | 370/395.1 |
| 5,822,321 A | * | 10/1998 | Petersen et al. | 370/474 |
| 5,978,375 A | * | 11/1999 | Petersen et al. | 370/395.7 |
| 6,061,354 A | * | 5/2000 | Morikawa et al. | 370/395.7 |

* cited by examiner

Primary Examiner—Ricky Ngo
Assistant Examiner—Phuc Tran
(74) Attorney, Agent, or Firm—Patton Boggs, LLP (57) ABSTRACT

The present communications channel synchronous micro-cell system for integrating circuit and packet data transmissions functions to blend both circuit and packet technology together to carry both constant bit rate and variable bit rate traffic with no added packet or jitter delay for constant bit rate traffic and no added circuit setup delay for variable bit rate traffic. This is accomplished by the use of a micro-cell structure for all information that is transmitted over a communication channel. The data stream comprises a series of frames, each of which consists of a predetermined number of micro-cells. The micro-cells are fixed in size, with a header, like Asynchronous Transfer Mode, but their similarity stops there. The header is a flag which indicates the type of payload that is placed in the micro-cell associated with that header. When the header indicates a payload that is synchronous with the communication medium, that micro-cell is being used as a time slot in a circuit switched sense. When the header indicates a payload that is asynchronous with the communication medium, that micro-cell is being used to transfer packets of data, which are routed by the address data embedded in the header of the packet data, independent of the micro-cell location in the frame.

20 Claims, 6 Drawing Sheets

COMMUNICATIONS CHANNEL SYNCHRONOUS MICRO-CELL FOR INTEGRATING CIRCUIT AND PACKET DATA TRANSMISSIONS

FIELD OF THE INVENTION

This invention relates to telecommunications systems that use a single communications medium to transmit both constant bit rate, circuit-like and variable bit rate, data-like traffic and, in particular, to a communications channel that uses synchronous micro-cells to integrate circuit and packet data transmissions to concurrently serve both types of transmissions.

PROBLEM

It is a problem in the field of telecommunications systems to transmit constant bit rate, circuit-like and variable bit rate, data-like traffic via a single communication medium. For example, Asynchronous Transfer Mode (ATM) is a packet oriented data transfer mode that uses an asynchronous time division multiplexing technique. The term "transfer mode" refers to a set of methods which cover transmission, multiplexing, and switching in a telecommunications environment. Asynchronous Transfer Mode networks carry telephony, video and data services over a single communications network. The Asynchronous Transfer Mode transport network is divided into two layers: an ATM Layer which involves the switching aspects of the network and the Physical Layer which involves the transmission aspects. The ATM Layer implements on-demand establishment of virtual connections between endpoints to transmit the required message(s). Therefore, the message originating party can be connected to the ATM Network, but does not consume transmission capacity until a message is originated to a designated destination.

Asynchronous Transfer Mode (ATM) technology uses a common 53 octet cell definition for both constant bit rate and variable bit rate traffic. The assignment of a cell within the cell stream to a particular virtual circuit is asynchronous to the underlying transport method, making the multiplexing of virtual circuits easy, but the simulation of delay-sensitive, constant bit rate traffic is complicated in this environment. A variety of high priority queues and jitter smoothing buffers are needed to transmit the constant bit rate traffic over the Asynchronous Transfer Mode network in a manner that emulates a circuit switched data transmission medium. Also, packet filling delay for low data rate circuits is unavoidable because of the fixed 53 byte size of the Asynchronous Transfer Mode cells.

An alternative approach is to transport data traffic from both constant bit rate sources and variable bit rate sources via IP packet streams, with reliance on overengineering of the underlying packet network and the use of readout buffers to ameliorate the delay characteristics of the underlying network. Simulating constant bit rate traffic streams via IP inherently has the same problems as the above-noted Asynchronous Transfer Mode, only with more severe delay and delay-variation characteristics. The use of only circuit switching to carry both constant bit rate and variable bit rate traffic has also been proposed in the past, but this requires rapid setup and removal of circuit connections to avoid excessive startup delays for the delivery of packets. In all cases, the use of a single data transmission medium technology (circuit switched or packet switched) results in disadvantaging the other technology (packet data or circuit data).

One proposed solution to this conundrum was disclosed in a paper titled "Adaptive Digital Access Protocol: A MAC Protocol for Multiservice Broadband Access Networks" published by James E. Dail et. al. in the March 1996 issue of IEEE Communications Magazine on pages 104–112. The Dail article proposes a protocol which supports multiservice—synchronous transfer mode and asynchronous transfer mode—applications in the context of a subscriber's access to a coaxial cable network that has a tree and branch architecture. The Dail protocol is designed to adapt to changing data transmission demands for multi-media communications by providing a variable mix of circuit and cell mode applications. The bandwidth of this data transmission system is dynamically allocated by shifting the cell boundaries in the transmission stream to accommodate the varying need for synchronous and asynchronous traffic. In the transmission stream, each frame is divided into an asynchronous and a synchronous region, with the boundary between the two regions being changed on a dynamic basis. A plurality of synchronous signals are multiplexed into the synchronous region of the frame and the asynchronous region of the frame likewise serves a plurality of multiplexed asynchronous signals. The data traffic can be any combination of constant bit rate, variable bit rate and available bit rate data. The boundary between the two regions of the frame is denoted by a unique pattern of headers prepended to the asynchronous data. However, the Dail protocol requires a significant volume of data traffic to be practical and the overhead associated with dynamically shifting the region boundary is costly.

Thus, there is presently no data transmission system that use a single communications medium technology to transmit both constant bit rate, circuit-like and variable bit rate, data-like traffic in a manner that is transparent to both types of traffic and does not result in disadvantaging the other technology (packet data or circuit data).

SOLUTION

The above described problems are solved and a technical advance achieved in the field by the present communications channel synchronous micro-cell system for integrating circuit and packet data transmissions which functions to blend both circuit and packet technology together to carry both constant bit rate and variable bit rate traffic with no added packet or jitter delay for constant bit rate traffic and no added circuit setup delay for variable bit rate traffic. This is accomplished by the use of a micro-cell structure for all information that is transmitted over a communication channel. The data stream comprises a series of frames, each of which consists of a predetermined number of micro-cells. The micro-cells are fixed in size, with a header, like Asynchronous Transfer Mode, but their similarity stops there. The header is a simple flag which indicates the type of payload that is placed in the micro-cell associated with that header. When the header indicates a payload that is synchronous with the communication medium, that micro-cell is being used as a time slot in a circuit switched sense. When the header indicates a payload that is asynchronous with the communication medium, that micro-cell is being used to transfer sub-elements of data packets, which are routed by the address data embedded in the header of the packet data, independent of the micro-cell location in the frame.

Thus, Ethernet frames are carried across the communication medium in whatever micro-cells are available for asynchronous packet use and are then marked as packet. The number of micro-cell positions available during each frame of the data stream can vary as a function of the circuit traffic load. The flow of packets are orchestrated to be staggered on the input to provide substantially equal access to the communication medium for all packet originating parties. In addition, the circuit data has priority in the assignment of micro-cells since it is real-time data and cannot be delayed in its transmission.

DETAILED DESCRIPTION

Customer equipment are connected to a telecommunications network by means of a communication medium which implements a predetermined communication technology. The telecommunications network provides the overall end-to-end switching of the signals generated by the customer equipment to thereby interconnect subscribers at the customer equipment with desired destinations. The data communications originating from the customer equipment include not only the traditional voice-only telecommunication services but also Internet-based multi-media services. These multi-media services can entail any combination of media. It is therefore advantageous to integrate all communications into a single transmission medium. However, telecommunications networks are traditionally implemented using a real time, circuit switched transmission medium while data networks are implemented using an asynchronous, packet switched transmission medium. As noted above, it is a problem to efficiently transmit constant bit rate, circuit-like and variable bit rate, data-like traffic via a single communication medium.

The present communications channel synchronous micro-cell system for integrating circuit and packet data transmissions uses a micro-cell structure for all information that is transmitted over a communication channel. The data stream comprises a series of frames, each of which consists of a predetermined number of micro-cells. The micro-cells are fixed in size, with a header, like Asynchronous Transfer Mode, but their similarity stops there. The header is a simple flag which indicates the type of payload that is placed in the micro-cell associated with that header. When the header indicates a payload that is synchronous with the communication medium, that micro-cell is being used as a time slot in a circuit switched sense. When the header indicates a payload that is asynchronous with the communication medium, that micro-cell is being used to transfer sub-elements of data packets, which are routed by the address data embedded in the header of the packet data, independent of the micro-cell location in the frame.

The differences between Asynchronous Transfer Mode and the present communications channel synchronous micro-cell system for integrating circuit and packet data transmissions are given in the following table:

|  | Asynchronous Transfer Mode | Micro-Cell System |
| --- | --- | --- |
| Relation with the underlying channel | Asynchronous with underlying communication channel | Synchronous with underlying communication channel for circuit data, while streams of packet data are inserted in an asynchronous manner into available micro-cells |
| Type of circuits | Virtual circuits for constant bit rate and variable bit rate | Real circuits for constant bit rate and shared bandwidth for variable bit rate |
| Type of Switching | Label switching | Circuit and packet switching |
| Data Format | 5 octet per 48 octet payload | 2 bit header per n octets of payload |

The header used in the micro-cells is a flag which indicates the type of payload associated with the header. When the header indicates that the payload inserted into the micro-cell is synchronous with the communication medium, the payload is being used as a time slot in a circuit. When the header indicates that the payload inserted into the micro-cell is asynchronous with the communication medium, the payload is being used to transfer packets of data which are routed by the address data embedded in the header of the packet data, independent of the time slot location. Typical selections for the header are illustrated in the following table:

| Header | Micro-Cell Contents |
| --- | --- |
| 00 | Empty |
| 01 | Circuit |
| 10 | Packet |
| 11 | Error |

There are two examples of the use of this concept in existing environments, where a circuit switching connection is maintained as available for use in a call connection, but whose time slots are also available for use in carrying packet data in the circuit switch environment. A first example is where an in-facility call control signaling circuit, which extends from the switch to a user or another network node, is mainly used at call setup and tear-down for call control signaling purposes. During the call connection, the time slots reserved for this call control signaling circuit are filled with idle codes. Using the present communications channel synchronous micro-cell system for integrating circuit and packet data transmissions, the system can vary the markings of the micro-cell headers to mark these call control signaling reserved time slots as available for use in carrying packet traffic whenever no call control signaling messages need to be sent. This requires that the circuit switching function in the micro-cell switch keeps the micro-cell headers intact when switching circuits. The system can not rely solely on the circuit set-up information that the switch maintains today to decide at the I/O card which time slots are available for packet data.

A second example of a circuit that is not always used to capacity is a coded voice call, where less than the 64 Kbps channel capacity is needed to transfer a coded version of a voice sample, as in wireless communications applications. Today, the coded voice sample is converted back to a 64 Kbps format for transmission across the public telephone network. The present communications channel synchronous micro-cell system for integrating circuit and packet data transmissions obviates the need to decode the coded signal, since it can travel in its present form on a 64 Kbps micro-cell circuit that only marks a sufficient number of time slots as circuit mode to carry the reduced bandwidth signal. All unneeded time slots in the 64 Kbps channel are marked as available to carry packet data. This requires that the micro-cell switching fabric carry the micro-cell headers from input to output.

Communications Channel Synchronous Micro-Cell System

Figure 1:
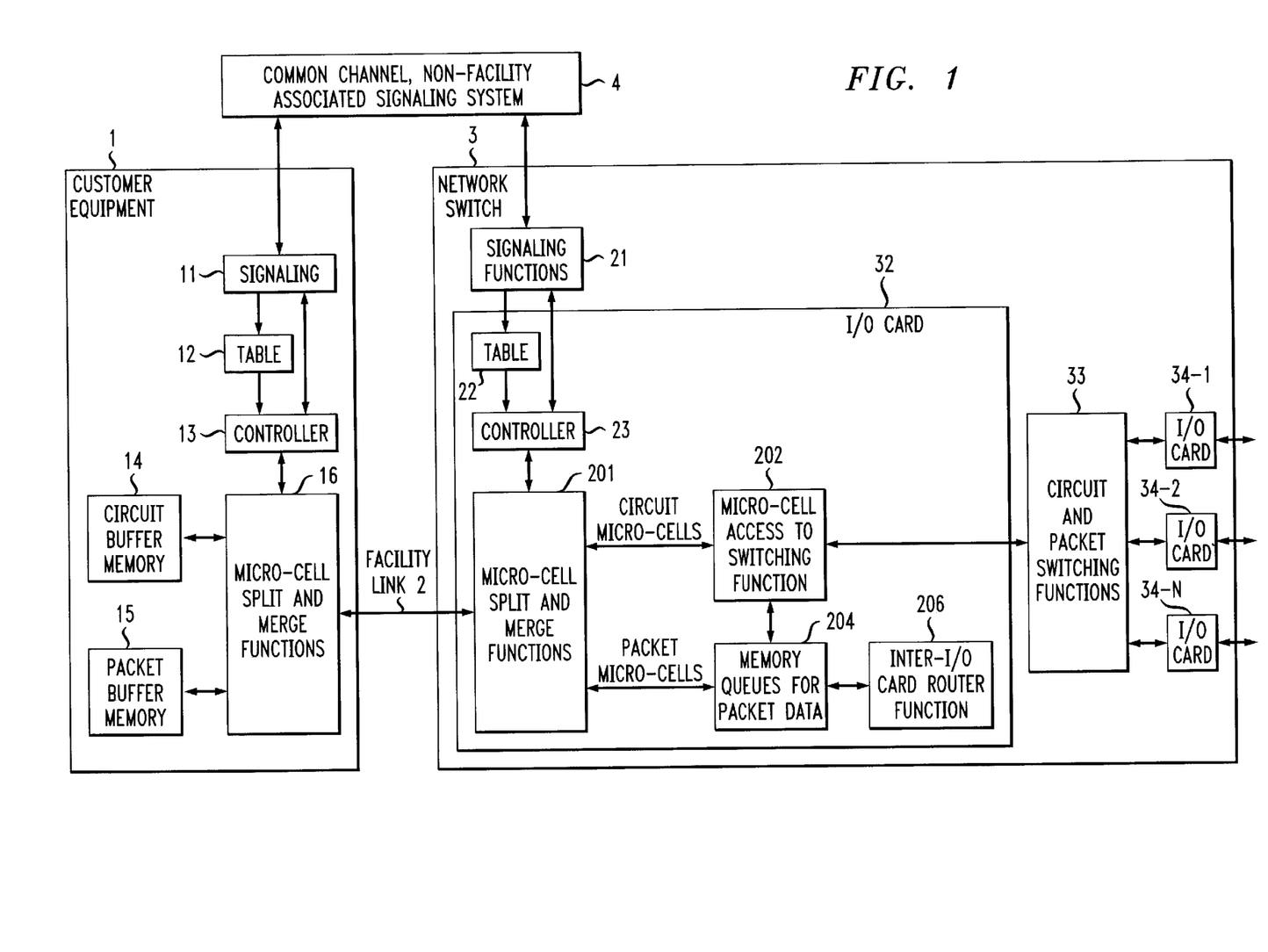
FIG. 1 illustrates in block diagram form the overall architecture of the present communications channel synchronous micro-cell system for integrating circuit and packet data transmissions and a typical system environment in which this is implemented.
Figure 4:
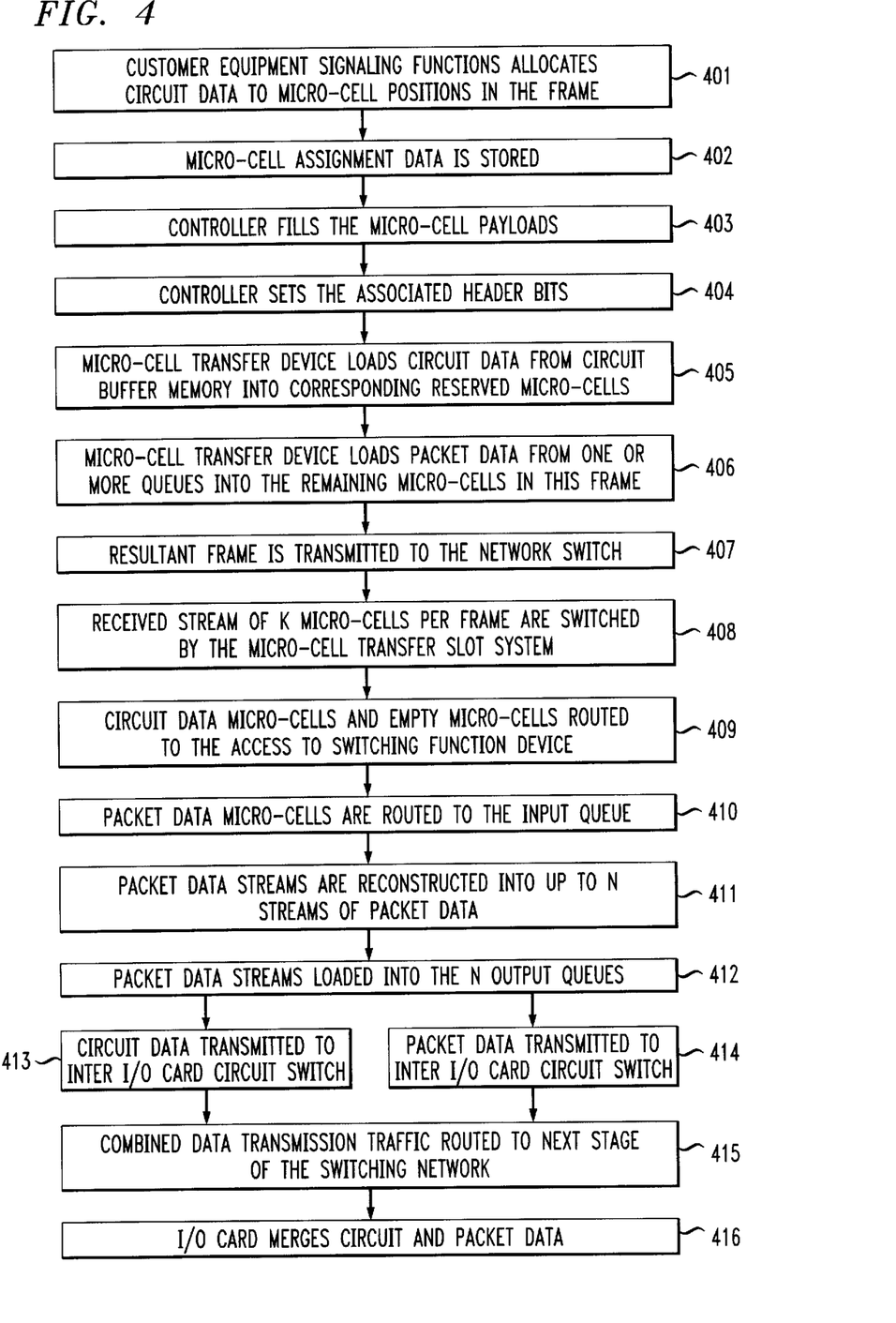
FIG. 4 illustrates in flow diagram form the operation of the present communications channel synchronous micro-cell system for integrating circuit and packet data transmissions.

FIG. 1 illustrates in block diagram form the overall architecture of the present communications channel synchronous micro-cell system for integrating circuit and packet data transmissions and a typical system environment in which this is implemented while FIG. 4 illustrates in flow diagram form the operation of the present communications channel synchronous micro-cell system for integrating circuit and packet data transmissions.

The customer equipment 1 consists of some telecommunication equipment that is typically associated with a plurality of subscriber communication devices, including, but not limited to: telephone station set, personal computer, facsimile machine, network server, and the like. The customer equipment 1 has a set capacity of micro-cells that cross a data transmission medium 2 to a network switch 3. For the sake of example, assume that the data transmission medium 2 can transport N micro-cell positions per 125 $\mu$sec frame in both directions and that three of the positions are used to provide circuit switched connections (N-ISDN model). Assume that the IP packets are transferred over the data transmission medium 2 encapsulated in Ethernet frames for the remaining micro-cells of the frame. At all times the data transmission medium 2 transfers micro-cells synchronously between the customer equipment 1 and the network switch 3.

The customer equipment 1 typically includes a set of signaling functions 11 that allocate the circuit data to micro-cell positions in the frame at step 401. The micro-cell assignment data is stored, typically by being written into a table 12 in a memory in the customer equipment 1 at step 402. The contents of the table 12 are used by a controller 13 at step 403 to fill the micro-cell payloads and set the associated header bits at step 404 to the proper setting to reflect the nature of the payload contained in the associated micro-cell. A circuit buffer memory 14 is provided to store the circuit data as it is being generated by the subscriber devices in real time. Similarly, a packet buffer memory 15 is used to establish a plurality of queues to store the packet data for the corresponding plurality of packet data generating subscriber devices served by the customer equipment 1. A micro-cell transfer device 16 uses the data stored in the micro-cell assignment table 12 to load circuit data from the circuit buffer memory 14 into the corresponding reserved micro-cells in this frame of the data transmission at step 405 and a set of packet data from one or more of the queues created in the packet buffer memory 15 into the remaining micro-cells in this frame of the data transmission at step 406. The resultant frame is transmitted at step 407 to the network switch 3 via the data transmission medium 2, where it is received and processed as described below with respect to FIGS. 2, 3 and 5.

One of the micro-cell positions can be specified to be a signaling channel from the customer equipment 1 to the network switch 3. Alternatively, a common channel non-facility associated signaling system 4, as shown in FIG. 1, can be used for this purpose. When signaling is initiated, the micro-cells in the signaling channel position are marked as circuit payload with a header of 01 to ensure priority and their content is forwarded to the signaling software 21 in the network switch 3. When no signaling occurs, the micro-cells can be marked as packet payload with a header of 10 and the micro-cells are used to transfer Ethernet frames. When no circuits are active and no signaling is active, all of the micro-cell positions are available to carry Ethernet frames. The micro-cells are filled in an order known to both sides of the link and all cells are marked as packet payload with a header of 10.

When a circuit is to be set up, signaling between the customer equipment 1 and the network switch 3 picks one of the micro-cell positions of the frames being send via the data transmission medium 2 to carry the circuit connection, such as a voice call. The customer equipment 1 and the network switch 3 mark all micro-cells in that position in the stream of frames as circuit payload with a header of 01. At the network switch 3, the micro-cells marked as circuit data are carried to an output port 32 on the network switch 3 or to the next stage 33 of the internal switching network, which interconnects the micro-cell position to another micro-cell Input/Output card 34-2 to 34-N. Sub-rate circuits can easily be implemented in this system by marking only every nth micro-cell in that position in the frame as a circuit connection. The other occurring micro-cells are marked as packet and can be used to carry octets of Ethernet data.

Ethernet frames are carried across the data transmission medium 2 in whatever micro-cells are available and marked as packet. The number of micro-cell positions available during each frame for asynchronous traffic use can vary as a function of circuit traffic load. The flow of packets are orchestrated to be staggered on the input to provide substantially equal access to the data transmission medium 2 for all packet originating parties. IP packets are carried within Ethernet frames and a per-I/O card router is used to direct packets from the incoming micro-cell frame and I/O port 32 to a selected output I/O port 34-2 to 34-N.

Access from one I/O port router to another is accomplished in any of a number of ways:

a.) A standard circuit switch technology can be used to interconnect all I/O cards. Circuits wide enough to carry micro-cells between I/O cards would be established as today and micro-cells would be exchanged between I/O cards as circuit time slots are exchanged today. Packet traffic would use micro-cell time slots not needed for circuit traffic, by dynamically assigning the available micro-cell time slots to carry packet streams between I/O cards. The targeting of packet micro-cell time slots from one I/O card to another would be established at the rearrangement rate of the circuit switch technology with arbitration algorithms implementing a quality-of-service policy for packet transfer from one I/O card to another.

b.) A separate circuit switch and packet switch can be used to interconnect I/O card circuit switching devices to other I/O circuit switching devices and I/O card packet switching devices to other I/O card packet switching devices. For example, a micro-cell time slot interchange device could interconnect circuit elements while an Ethernet switch could interconnect packet elements. This is the preferred embodiment.

Input/Output Card

Figure 2:
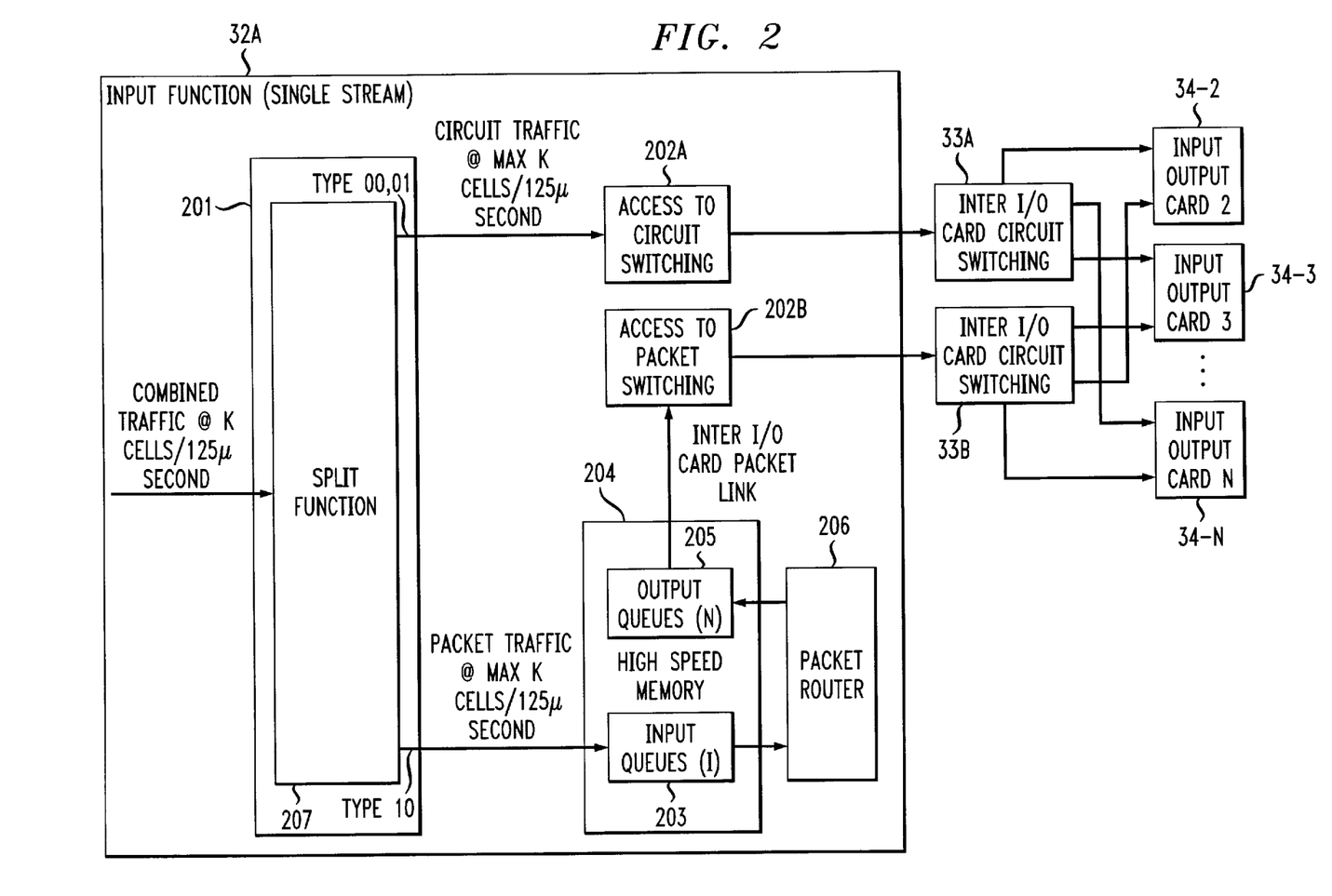
FIGS. 2 and 3 illustrate in block diagram form the implementation of the present communications channel synchronous micro-cell system for integrating circuit and packet data transmissions for traffic entering and traffic leaving an Input/Output card, respectively.
Figure 3:
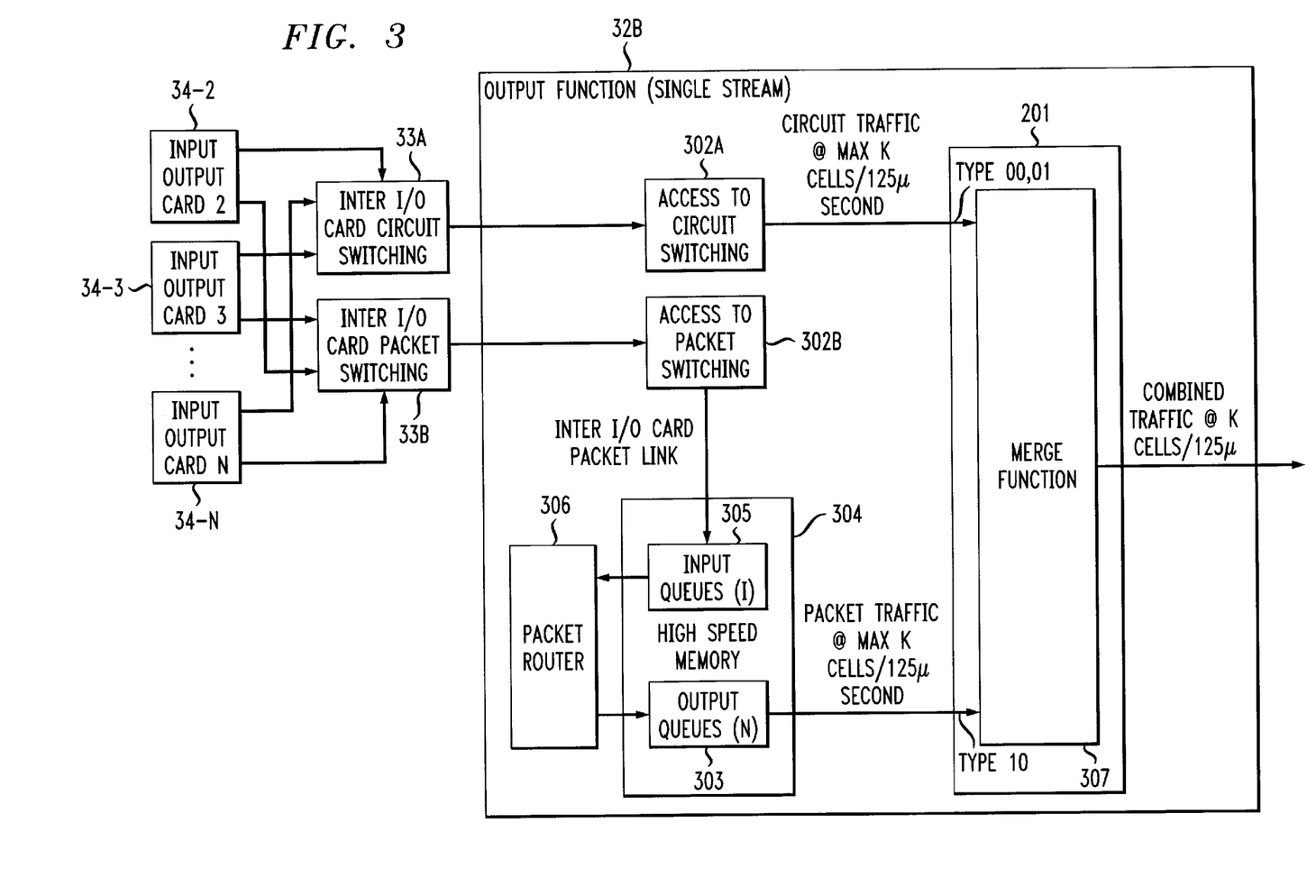
Figure 5:
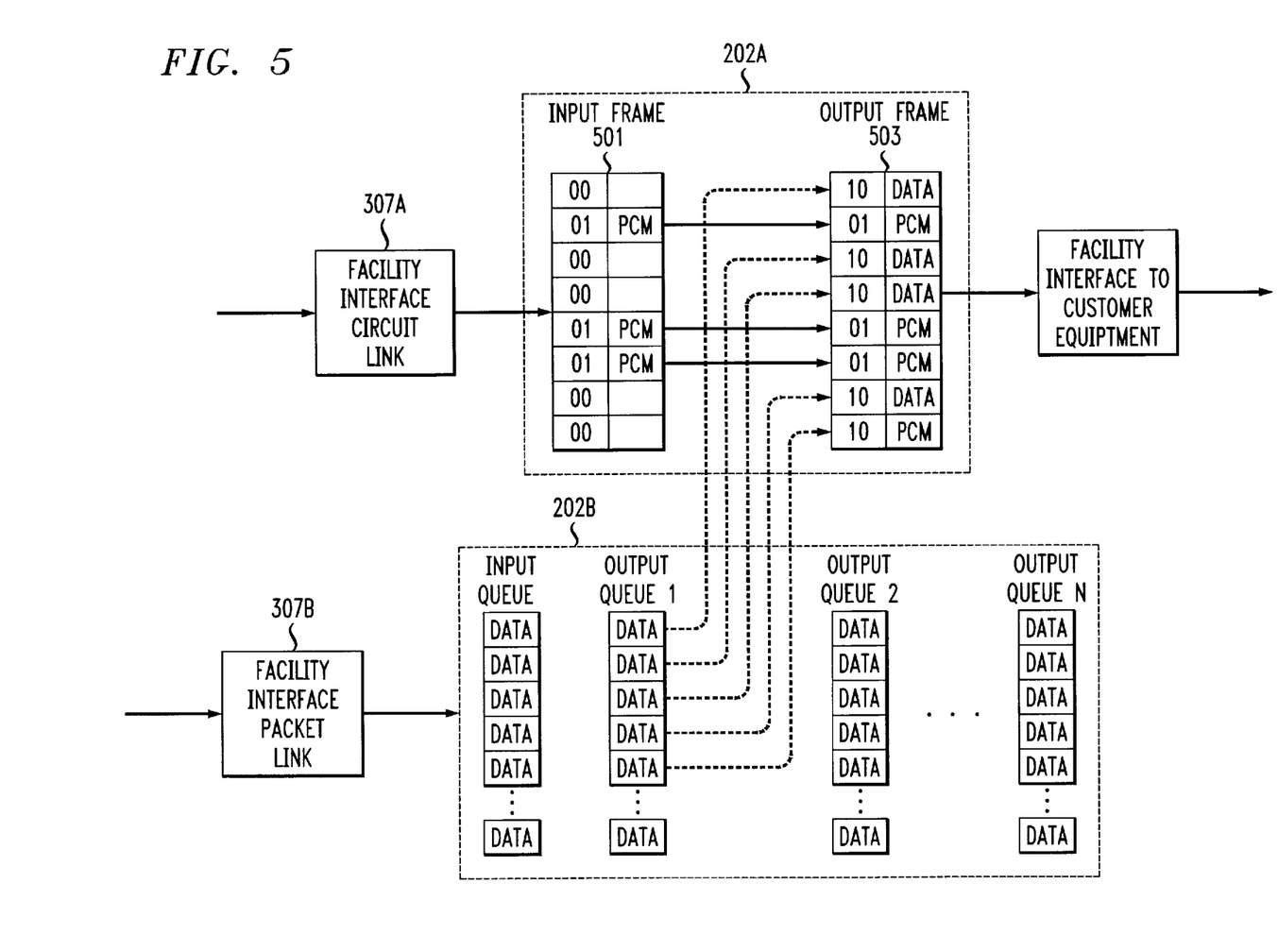
FIG. 5 illustrates additional detail of the merge function illustrated in FIGS. 1–3.

FIGS. 2 and 3 illustrate in block diagram form the implementation of the present communications channel synchronous micro-cells for integrating circuit and packet data transmissions for traffic entering and traffic leaving an Input/Output card 32, respectively while FIG. 5 illustrates in conceptual form the merge function illustrated in FIG. 3. The traffic entering the Input/Output Card 32A consists of the combined data communication traffic from the customer equipment 1. This data communication traffic consists of K micro-cells per frame, where the frame duration is assumed to be 125 μsec in duration. The contents of the K micro-cells are a mixture of constant bit rate, circuit-like and variable bit rate, data-like traffic. The received stream of K micro-cells per frame are switched by the split function 207 of the Micro-Cell Transfer Slot system 201 at step 408 which uses the header of each micro-cell at step 408 to determine whether the micro-cell contents are circuit data, packet data or whether the micro-cell is empty or contains errors. The circuit data micro-cells and the empty micro-cells are routed at step 409 to the access to switching function device 202, which operates as described below in relation to FIG. 5. The packet data micro-cells are concurrently routed to the input queue 203 of high speed memory 204 at step 410, where the packet data streams are stored, then reconstructed at step 411 into up to N streams of packet data and loaded into the N output queues 205 at step 412. The number of streams is a function of the number of concurrently active transmission from the customer equipment 1. The volume of the packet data received by the input queue is a function of the available bandwidth in the frame of micro-cells received from the customer equipment 1. The router function 206 serves to control the operation of the high speed memory 204 and its input 203 and output 205 queues. In particular, the router function 206 must identify each of the plurality of data streams and manage the transport of the received data packets into the proper output queues 205 for transmission to the access to packet switching function device 202B and thence to the next stage 33B of the switching network via a frame of N micro-cells.

The output of the access to circuit switching function device 202A comprises a plurality of micro-cells, which are transmitted to the Inter I/O card circuit switching function 33A at step 413, where each of which micro-cells can be switched individually to any I/O card on the system at step 415. The destination of each micro-cell is determined when a circuit is established via management or call-processing functions. All micro-cells not allocated to a circuit are marked as empty (00) in the micro-cell header. The output of the access to packet switching function device 202B comprises a plurality of micro-cells, which are transmitted to the Inter I/O card packet switching function 33B at step 414, where each of which micro-cells can be switched individually to any I/O card on the system at step 415. Standard implementations of packet switches and routers can be used to transfer frames of packet information from one I/O card on the system to any other I/O card on the system. Once the micro-cells are received at a selected I/O Card, at step 416, they are merged and processed as described with respect to FIG. 3.

The traffic entering an Input/Output Card 34-2, 34-3, to 34-N consists of circuit and packet communication traffic from customer equipment 1. A more detailed look at the output function of the I/O Card is given in FIG. 3. The circuit data from other I/O Cards is carried into an access from circuit switching device 302A to provide access from the Inter I/O Card circuit switching stage 33A. Transmission frames that are transferred between the devices 33A and 302A hold micro-cells with headers that indicate empty micro-cells (00) or circuit micro-cells (01). Both types of micro-cells are transferred to the merge function 307. Packet data information arrives at an access from packet switching device 302B from an Inter I/O Card Packet Switching device 33B. Transmission frames that are transferred between devices 33B and 302B hold packets of data in a standard packet transmission format. The packets are stored by the access from packet switching device 302B into an input queue 305 in high speed memory 304. A packet router device 306 interprets the packet and routes it to an output queue based on information contained in the packet header, for example destination IP address. One or more output queues may be implemented to allow different policies for access to the transmission facility between the I/O card and the customer equipment 1, for example priority, to be applied to different streams of packets. In particular, the packet router 306 must identify each of the plurality of data streams and manage the transport of the received data packets into the proper position in the output queues 303 for transmission to the merge function 307 of the micro-cell transfer slot system 201. The merge function 307 merges data from the access from circuit switching device 302A and access from packet switching device 302B onto the transmission medium that connects the I/O Card to the customer equipment 1.

Access to Switching Function Device

The merge function device 202 is illustrated in conceptual form in FIG. 5. A portion of the high speed memory 304 is included in this Figure to illustrate the N output queues 303 and how the data contained therein is selected and transmitted to the merge function device 202. The merge function device 202 consists of a buffer memory 501 of N stages, which can store up to N micro-cells in a received frame. The received circuit data is written into the predesignated ones of the N stages, corresponding to the position of the associated micro-cell in the frame. As shown in FIG. 5, there are three circuit data elements in Pulse Code Modulation (PCM) form that are written into the buffer memory 501. The remaining buffer memory stages are unused and the merge function device 202 therefore merges the three circuit micro-cells with N-3 packets of data from the output queues 303. As shown in FIG. 5, the merging in this case consists of a burst transmission of packet data with N-3 packets from the Output Queue 1 being loaded into corresponding sequentially ordered micro-cells of the merge buffer memory 503 as the three circuit data elements are loaded therein. The merge buffer memory 503 then contains N micro-cells of data which are transmitted to the customer equipment. This data communication traffic consists of N micro-cells per frame, where the frame duration is assumed to be 125 μsec in duration. The contents of the N micro-cells are a mixture of constant bit rate, circuit-like and variable bit rate, data-like traffic.

Multiple Facility Embodiment

Figure 6:
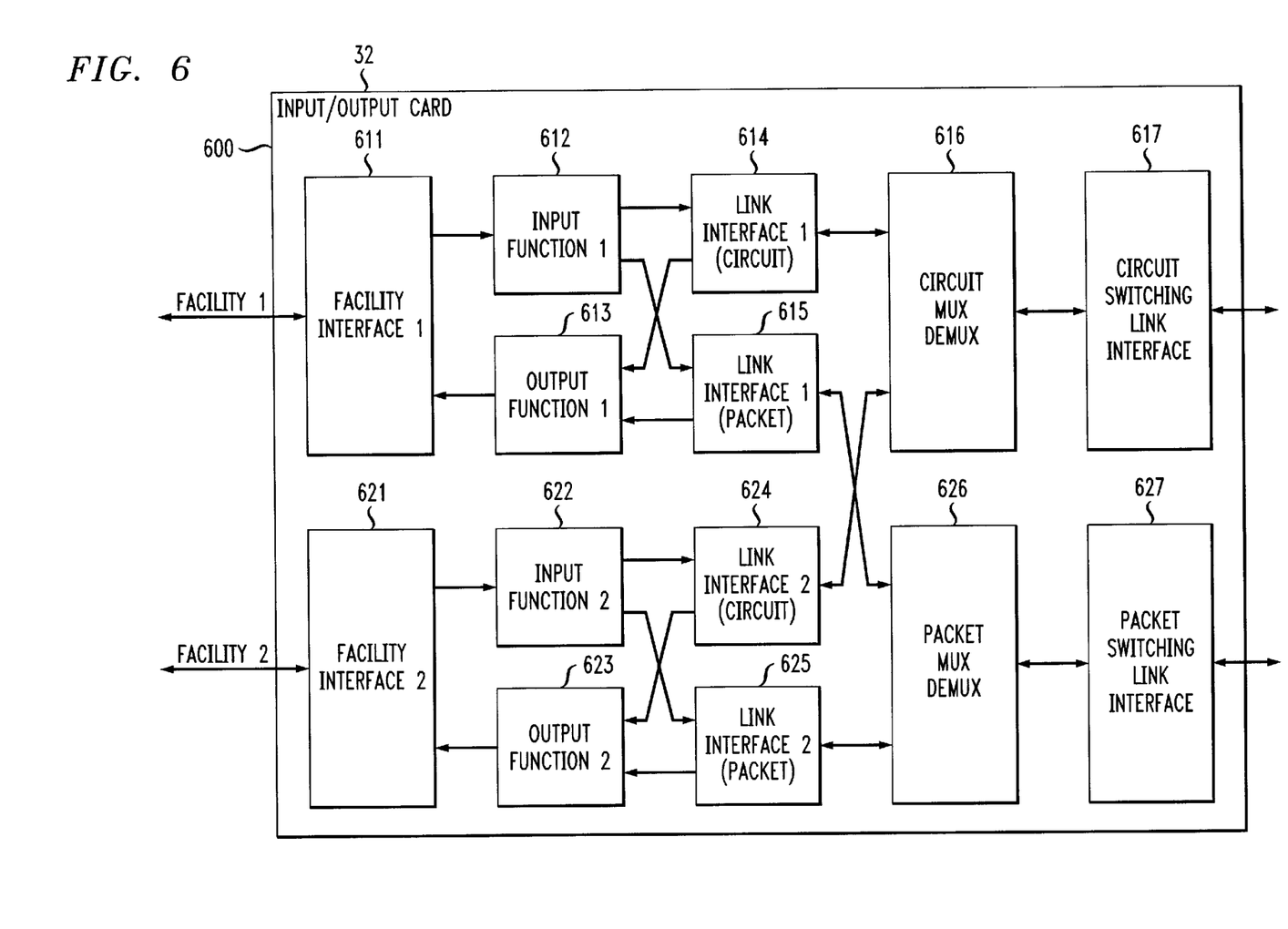
FIG. 6 illustrates in block diagram form a multiple facility embodiment of the present communications channel synchronous micro-cell system for integrating circuit and packet data transmissions.

FIG. 6 illustrates in block diagram form a multiple facility embodiment of the present communications channel synchronous micro-cell system for integrating circuit and packet data transmissions. In particular, an Input/Output card 600 serves at least two sets of customer equipment (not shown) connected via data transmission facilities, Facility 1 and Facility 2. The Input/Output card 600 includes a facility interface 611, 621 for terminating the data transmission facilities, Facility 1 and Facility 2 and interconnect with the respective Input functions 1, 2 (612, 622) and Output functions 1, 2 (613, 623). Both the Input functions 612, 622 and Output functions 613, 623 function to split/merge the circuit and packet data for exchange with the corresponding Link Interface 1, 2 Circuit (614, 624) and Link Interface 1,

2 Packet (615, 625). The circuit multiplexer/demultiplexer 616 serves to combine the circuit outputs from the Link Interfaces, 2 Circuit (614, 624) for transmission to circuit switching link interface 617 for transmission to a circuit destination. Similarly, the packet multiplexer/demultiplexer 626 serves to combine the packet outputs from the Link Interface 1, 2 Packet (615, 625) for transmission to packet switching link interface 627 for transmission to a packet destination. As can be seen from this diagram, there can be multiple sets of apparatus interconnected on a single Input/Output card and a plurality of facilities can be used to interconnect a plurality of customer equipment with a circuit destination and a packet destination.

SUMMARY

The present communications channel synchronous micro-cell system for integrating circuit and packet data transmissions functions to blend both circuit and packet technology together to carry both constant bit rate and variable bit rate traffic with no added packet or jitter delay for constant bit rate traffic and no added circuit setup delay for variable bit rate traffic. This is accomplished by the use of a micro-cell structure for all information that is transmitted over a communication channel.

What is claimed:

1. A communications channel synchronous micro-cell system for integrating circuit and packet data transmissions on a single transmission medium that interconnects customer equipment and a network switch, comprising:

means for generating a series of frames, each of said frames comprising a predetermined integer number, k, of micro-cells, for transmission between said customer equipment and said network switch via said single transmission medium; and means, responsive to the generation of n circuit data transmissions in said customer equipment, for reserving n selected ones of said micro-cells, each of said n selected ones of said micro-cells for transmitting a corresponding one of said n circuit data transmissions from said customer equipment to said network switch.

2. The communications channel synchronous micro-cell system for integrating circuit and packet data transmissions of claim 1 further comprising:

means, responsive to the generation of n circuit data transmissions in said customer equipment, for selecting up to k-n micro-cells for the transmission of said packet data transmissions.

3. The communications channel synchronous micro-cell system for integrating circuit and packet data transmissions of claim 2 further comprising:

means for exchanging signaling control data between said customer equipment and said network switch via use of said micro-cells on said single transmission medium.

4. The communications channel synchronous micro-cell system for integrating circuit and packet data transmissions of claim 2 further comprising:

means for prepending a header to said circuit data transmissions and said packet data transmissions in each of said plurality of micro-cells to indicate a content of an associated one of said plurality of micro-cells.

5. The communications channel synchronous micro-cell system for integrating circuit and packet data transmissions of claim 4 further comprising:

means, responsive to receipt of a frame of said data transmission, for reading a header from each of said plurality of micro-cells in said frame; and means, responsive to said read header, for routing a content of each of said plurality of micro-cells in said frame to a one of a circuit switch and a packet switch as a function of said read header.

6. The communications channel synchronous micro-cell system for integrating circuit and packet data transmissions of claim 1 wherein said means for reserving comprises:

means for selecting a micro-cell position in said frame for each of said n selected ones of said micro-cells; and means for inserting said n circuit data transmissions in their corresponding one of said each of said n selected ones of said micro-cells for each frame in said data transmission.

7. The communications channel synchronous micro-cell system for integrating circuit and packet data transmissions of claim 6 wherein said means for reserving further comprises:

means for determining a data transmission rate for at least one of said n circuit data transmissions; and means, responsive to said determined data rate being less than a data rate of said associated selected micro-cell, for inserting said n circuit data transmissions in their corresponding one of said each of said n selected ones of said micro-cells for less than every frame in said data transmission.

8. A method of operating a communications channel synchronous micro-cell system for integrating circuit and packet data transmissions on a single transmission medium that interconnects customer equipment and a network switch, comprising the steps of:

generating a series of frames, each of said frames comprising a predetermined number, k, of micro-cells, for transmission between said customer equipment and said network switch via said single transmission medium; and reserving, in response to the generation of n circuit data transmissions in said customer equipment, n selected ones of said micro-cells, each of said n selected ones of said micro-cells for transmitting a corresponding one of said n circuit data transmissions from said customer equipment to said network switch.

9. The method of operating a communications channel synchronous micro-cell system for integrating circuit and packet data transmissions of claim 8 further comprising the step of:

selecting, in response to the generation of n circuit data transmissions in said customer equipment, up to k-n micro-cells for the transmission of said packet data transmissions.

10. The method of operating a communications channel synchronous micro-cell system for integrating circuit and packet data transmissions of claim 9 further comprising the step of:

exchanging signaling control data between said customer equipment and said network switch via use of said micro-cells on said single transmission medium.

11. The method of operating a communications channel synchronous micro-cell system for integrating circuit and packet data transmissions of claim 9 further comprising the step of:

prepending a header to said circuit data transmissions and said packet data transmissions in each of said plurality of micro-cells to indicate a content of an associated one of said plurality of micro-cells.

12. The method of operating a communications channel synchronous micro-cell system for integrating circuit and packet data transmissions of claim 11 further comprising the steps of:

reading, in response to receipt of a frame of said data transmission, a header from each of said plurality of micro-cells in said frame; and routing, in response to said read header, a content of each of said plurality of micro-cells in said frame to a one of a circuit switch and a packet switch as a function of said read header.

13. The method of operating a communications channel synchronous micro-cell system for integrating circuit and packet data transmissions of claim 8 wherein said step of reserving comprises:

selecting a micro-cell position in said frame for each of said n selected ones of said micro-cells; and inserting said n circuit data transmissions in their corresponding one of said each of said n selected ones of said micro-cells for each frame in said data transmission.

14. The method of operating a communications channel synchronous micro-cell system for integrating circuit and packet data transmissions of claim 13 wherein said step of reserving further comprises:

determining a data transmission rate for at least one of said n circuit data transmissions; and inserting, in response to said determined data rate being less than a data rate of said associated selected micro-cell, said n circuit data transmissions in their corresponding one of said each of said n selected ones of said micro-cells for less than every frame in said data transmission.

15. A communications channel synchronous micro-cell system for integrating circuit and packet data transmissions on a data transmission medium that interconnects customer equipment and a telecommunications switching network switch, comprising:

frame generating means for producing a series of data transmission frames, each of said frames comprising a predetermined integer number of micro-cells, for transmission between said customer equipment and said telecommunications switching network switch via said data transmission medium; and micro-cell reserving means, responsive to the generation of n circuit data transmissions in said customer equipment, for reserving n selected ones of said micro-cells, comprising:

micro-cell selecting means for selecting a micro-cell position in said frame for each of said n circuit data transmissions; and data insertion means for inserting a portion of each of said n circuit data transmissions into their corresponding one of said n selected ones of said micro-cells for each frame in said data transmission.

16. The communications channel synchronous micro-cell system for integrating circuit and packet data transmissions of claim 15 wherein said means for reserving further comprises:

measuring means for determining a data transmission rate for at least one of said n circuit data transmissions; and sub-rate transmission means, responsive to said determined data rate being less than a data rate of said associated selected micro-cell, for inserting said n circuit data transmissions in their corresponding one of said each of said n selected ones of said micro-cells for less than every frame in said data transmission.

17. The communications channel synchronous micro-cell system for integrating circuit and packet data transmissions of claim 15 further comprising:

packet data micro-cell selection means, responsive to the generation of n circuit data transmissions in said customer equipment, for selecting up to k-n micro-cells for the transmission of said packet data transmissions.

18. The communications channel synchronous micro-cell system for integrating circuit and packet data transmissions of claim 15 further comprising:

control signaling means for exchanging signaling control data between said customer equipment and said network switch via use of said micro-cells on said single transmission medium.

19. The communications channel synchronous micro-cell system for integrating circuit and packet data transmissions of claim 17 further comprising:

header generating means for prepending a header to said circuit data transmissions and said packet data transmissions in each of said plurality of micro-cells to indicate a content of an associated one of said plurality of micro-cells.

20. The communications channel synchronous micro-cell system for integrating circuit and packet data transmissions of claim 19 further comprising:

header decoding means, responsive to receipt of a frame of said data transmission, for reading a header from each of said plurality of micro-cells in said frame; and micro-cell routing means, responsive to said read header, for routing a content of each of said plurality of micro-cells in said frame to a one of a circuit switch and a packet switch as a function of said read header.

* * * * *